United States Patent
Etter

(10) Patent No.: US 8,135,587 B2
(45) Date of Patent: *Mar. 13, 2012

(54) ESTIMATING THE NOISE COMPONENTS OF A SIGNAL DURING PERIODS OF SPEECH ACTIVITY

(75) Inventor: Walter Etter, Highlands, NJ (US)

(73) Assignee: Alcatel Lucent, Paris (FR)

( * ) Notice: Subject to any disclaimer, the term of this patent is extended or adjusted under 35 U.S.C. 154(b) by 432 days.

This patent is subject to a terminal disclaimer.

(21) Appl. No.: 11/398,555

(22) Filed: Apr. 6, 2006

(65) Prior Publication Data

US 2006/0271360 A1    Nov. 30, 2006

Related U.S. Application Data

(63) Continuation of application No. 09/107,919, filed on Jun. 30, 1998, now Pat. No. 7,072,831.

(51) Int. Cl.
*G10L 21/02* (2006.01)
(52) U.S. Cl. ...................................................... 704/226
(58) Field of Classification Search .................. 704/210, 704/215, 226–228, 233
See application file for complete search history.

(56) References Cited

U.S. PATENT DOCUMENTS

| 4,185,168 | A | * | 1/1980 | Graupe et al. | 381/318 |
| 4,628,529 | A | | 12/1986 | Borth et al. | |
| 5,305,307 | A | | 4/1994 | Chu | |
| 5,550,924 | A | | 8/1996 | Helf et al. | |
| 6,001,131 | A | * | 12/1999 | Raman | 704/226 |
| 6,098,038 | A | | 8/2000 | Hermansky et al. | |
| 6,263,307 | B1 | * | 7/2001 | Arslan et al. | 704/226 |
| 6,415,253 | B1 | * | 7/2002 | Johnson | 704/210 |
| 7,072,831 | B1 | * | 7/2006 | Etter | 704/226 |

\* cited by examiner

*Primary Examiner* — Angela A Armstrong
(74) *Attorney, Agent, or Firm* — Capitol Patent & Trademark Law Firm, PLLC

(57) ABSTRACT

Enhanced estimation of the noise component of a signal is accomplished by using a plurality of filters. Each filter provides an estimate of a minimum sample in a sample set that includes a plurality of signal samples. A comparator, coupled to the plurality of filters, successively compares the estimates among the plurality of filters, and selects the signal estimate having the lowest magnitude. The selected signal estimate represents an enhanced estimate of the noise component of the signal.

4 Claims, 6 Drawing Sheets

ESTIMATING THE NOISE COMPONENTS OF A SIGNAL DURING PERIODS OF SPEECH ACTIVITY

RELATED APPLICATION

This application is a continuation of U.S. patent application Ser. No. 09/107,919 filed on Jun. 30, 1998 now U.S. Pat. No. 7,072,831 the contents of which are incorporated by reference herein in full as if set forth in full herein.

FIELD OF THE INVENTION

The invention relates generally to communications systems, and more specifically to techniques for estimating the noise components of a signal.

BACKGROUND OF THE INVENTION

Many present-day communication systems provide unpleasant speech quality in the presence of background noise. These communications systems are not able to adequately distinguish background noise from voice information, with the result that the system attempts to transmit both voice and noise over a communications link. At the other end of the communications link, this transmitted noise degrades the quality of the received voice signal. Such degradations are particularly serious in the context of wireless communications systems. For example, consider digital cellular telephone transceivers which incorporate speech coders so as to reduce the bit rate that must be transmitted over the communications channel. Although bit rate reduction is desirable in that it permits the capacity of wireless communication systems to be increased, it renders the communications system increasingly more susceptible to speech quality degradations in the presence of noise.

As a practical matter, it is difficult or impossible to determine the actual waveform of background noise. Therefore, in order to reduce the extent to which background noise degrades speech quality, it is necessary to develop an estimate of the characteristics of this noise. The characteristics of noise can be expressed in terms of a plurality of noise parameters. For purposes of improving speech quality, an estimate of noise parameters will suffice.

The primary focus of prior art noise estimation techniques has been on the estimation of noise parameters during speech pauses. Indeed, it is much more difficult to estimate noise parameters in the presence of speech activity and, as such, the prior art includes fewer examples of techniques for addressing this more complex problem. One approach for estimating noise parameters is disclosed in U.S. Pat. No. 4,185,168 issued to D. Graupe and G. D. Causey on Jan. 22, 1980 and entitled, "Method and Means for Adaptively Filtering Near-Stationary Noise From an Information Bearing Signal". This patent describes a noise estimator that detects the minima of a plurality of successively smoothed input magnitude values. The smallest minimum out of a predefined number of minima is used as an estimate for the spectral magnitude of the noise. A major drawback of the Graupe-Causey noise estimator is the lack of an adaptation mechanism to prevent the noise estimate from jumping up rapidly. These rapid jumps may be a problem in cases where the estimator attempts to follow speech instead of noise. Moreover, the presence of such a mechanism is important in cases where no spectral minima of speech occur during the period over which spectral minima are evaluated.

A noise estimator that eliminates the drawback described in the preceding paragraph is disclosed in a dissertation entitled, "Contributions to Noise Suppression in Monophonic Speech Signals," by Walter Etter, Ph.D. Thesis, ETH Zurich, 1993, available from the Swiss Federal Institute of Technology. This estimator, referred to as the "Two Time Parameter" (TTP) noise estimator, provides control over the attack time of the noise estimate through the use of a rise time limitation filter. Since the duration between spectral minima in speech follows a statistical pattern, no precise upper length for this duration can be specified. Therefore, a minimum tracker may provide, for example, a 95% certainty that it tracks speech minima. For the remaining 5%, the noise estimator would immediately attempt to follow high-level speech unless an appropriate mechanism, such as a rise time limitation filter, were in place to prevent immediate attacks and the consequent following of speech instead of noise.

Consider a more advanced TTP (two time parameter) noise estimator, which uses a minimum rise (MR) filter consisting of a minimum hold filter followed by a rise time limitation filter, where each of these filters is defined in terms of two time parameters related to the occurrence of phonemic minima in the speech signal. A significant drawback of the MR filter is its computational complexity. More specifically, the filter requires a step of successively selecting the smallest sample from a sequence of M samples, which is very demanding from a computational point of view. This complexity translates into higher product costs, requiring the use of a relatively elaborate digital signal processor, thereby reducing battery life in portable applications. Since, in general, a noise estimator is only part of an entire system, it is allocated only a small portion of the total signal processing power provided by a digital signal processor (DSP) integrated circuit. For the foregoing reasons, it is not economically feasible to implement an MR filter using present-day hardware. What is needed is a noise estimation technique that approximates the performance of an MR filter, while at the same time providing reduced computational complexity.

The prior art presents yet another shortcoming that relates to the accuracy of the noise estimate obtained from a signal. In the prior art, when noise and speech have similar magnitudes but substantially opposite phases, the noise and the speech cancel out, resulting in the occurrence of one or more minima in a set of samples. In the frequency domain, this set of samples may represent spectral magnitudes of a signal for which the noise component is to be estimated. By contrast, in the time domain, the sample set may represent short term average (or RMS) values of the signal. The noise estimation process is unable to distinguish minima attributable to phase cancellations from other minima that are attributable to the occurrence of phonemic minima in speech. However, the noise components of a signal can be estimated accurately during the occurrence of phonemic minima, but not during the aforementioned phase cancellations. The prior art approach mistakes phase cancellation minima for phonemic minima, resulting in an inaccurate estimate of noise. Note that prior art approaches, such as the previous two noise estimators described above, have addressed the phase cancellation problem in an ad-hoc way using a low pass pre-filter. Such a filter merely smoothes out short minima across the set of samples instead of eliminating these minima from the samples. In addition, a low pass pre-filter leads to a bias in the noise estimate, and it can be difficult or impossible to provide compensation for this bias. The prior art has failed to realize that this pre-filter plays an essential role in estimating noise from a speech signal, and that the use of a simple low pass filter is not an adequate approach. Also, the prior art fails to provide an analysis of this phase cancellation problem in order to define an appropriate filter characteristic of the prefilter.

SUMMARY OF THE INVENTION

According to a first embodiment of the invention, enhanced estimation of the noise component of a signal is accomplished by undertaking a prefiltering of a sample set prior to noise estimation. The prefiltering discards any sample minima in the sample set that are shorter than a specified duration so as to provide a prefiltered set of samples. For frequency domain operation, this sample set is in the form of samples representing spectral magnitudes of the signal. For time domain operation, the sample set represents short term average (or RMS) values of the signal. The prefiltering may be performed, for example, by holding a maximum sample value from a set of samples for the specified duration. The prefiltering process may be implemented using a short-term maximum hold filter, thereby providing considerable computational expediency over the short-term smoothing prefilters used in the prior art. Nevertheless, one primary advantage of the prefiltering process of the invention is that the prefiltered set of samples provides a noise estimate of enhanced accuracy relative to the prior art. In the prior art, when noise and speech have similar magnitudes but substantially opposite phases, the noise and the speech cancel out, resulting in the occurrence of one or more minima in the set of samples. The noise estimation process is unable to distinguish these minima, attributable to phase cancellations, from other minima that are attributable to the occurrence of phonemic minima in speech. However, the noise components of a signal can be estimated accurately during the occurrence of phonemic minima, but not during the aforementioned phase cancellations. The prior art approach mistakes phase cancellation minima for phonemic minima, resulting in an inaccurate estimate of noise. Pursuant to the techniques of the invention, the prefiltering process discards minima in the set of samples that are the result of phase cancellations. Therefore, any minima that remain in the prefiltered set of samples are due to phonemic minima, and not due to phase cancellation between speech and noise. In this manner, the invention provides a prefiltered set of samples from which an enhanced estimate of noise parameters may be obtained.

According to a second embodiment of the invention, enhanced estimation of the noise component of a signal is accomplished by undertaking a plurality of independent filterings of the signal, each filtering providing an estimate of a smallest sample in a sample set. For frequency domain operation, this sample set is in the form of samples representing spectral magnitudes of the signal. For time domain operation, the sample set represents short term average (or RMS) values of the signal. Advantageously, the signal estimate having the smallest value represents an enhanced estimate of the noise component. This approach provides reduced computational complexity relative to the prior art technique of determining the actual value of the smallest sample. In the prior art, a mathematical minimum operator must be employed to determine the actual sample value, and this operation is quite resource-intensive relative to the process of estimation.

A third embodiment of the invention combines the techniques of the first and second embodiments. Enhanced estimation of the noise component of a signal is accomplished by undertaking a prefiltering of signal samples prior to noise estimation. The prefiltering discards any sample minima shorter than a specified duration from the signal samples so as to provide a prefiltered set of signal samples. Next, a plurality of independent filterings of the signal are performed, each filtering providing an estimate of a smallest sample in a sample set. Advantageously, the signal estimate having the smallest value represents an enhanced estimate of the noise component.

DETAILED DESCRIPTION OF THE PREFERRED EMBODIMENTS

Prior art noise estimation techniques use a minimum rise (MR) filter which is defined herein as including a minimum hold filter followed by a rise time limitation filter. The minimum hold filter must repeatedly identify a minimum sample value from an incoming sample set, thereby placing heavy demands on computational resources. More specifically, the minimum-hold filter is called upon to perform an operation that successively selects the smallest (lowest-magnitude) sample from a sequence of M samples. It would be desirable to eliminate the need for this minimum-hold operation without significantly degrading the accuracy of the noise estimate.

Figure 1:
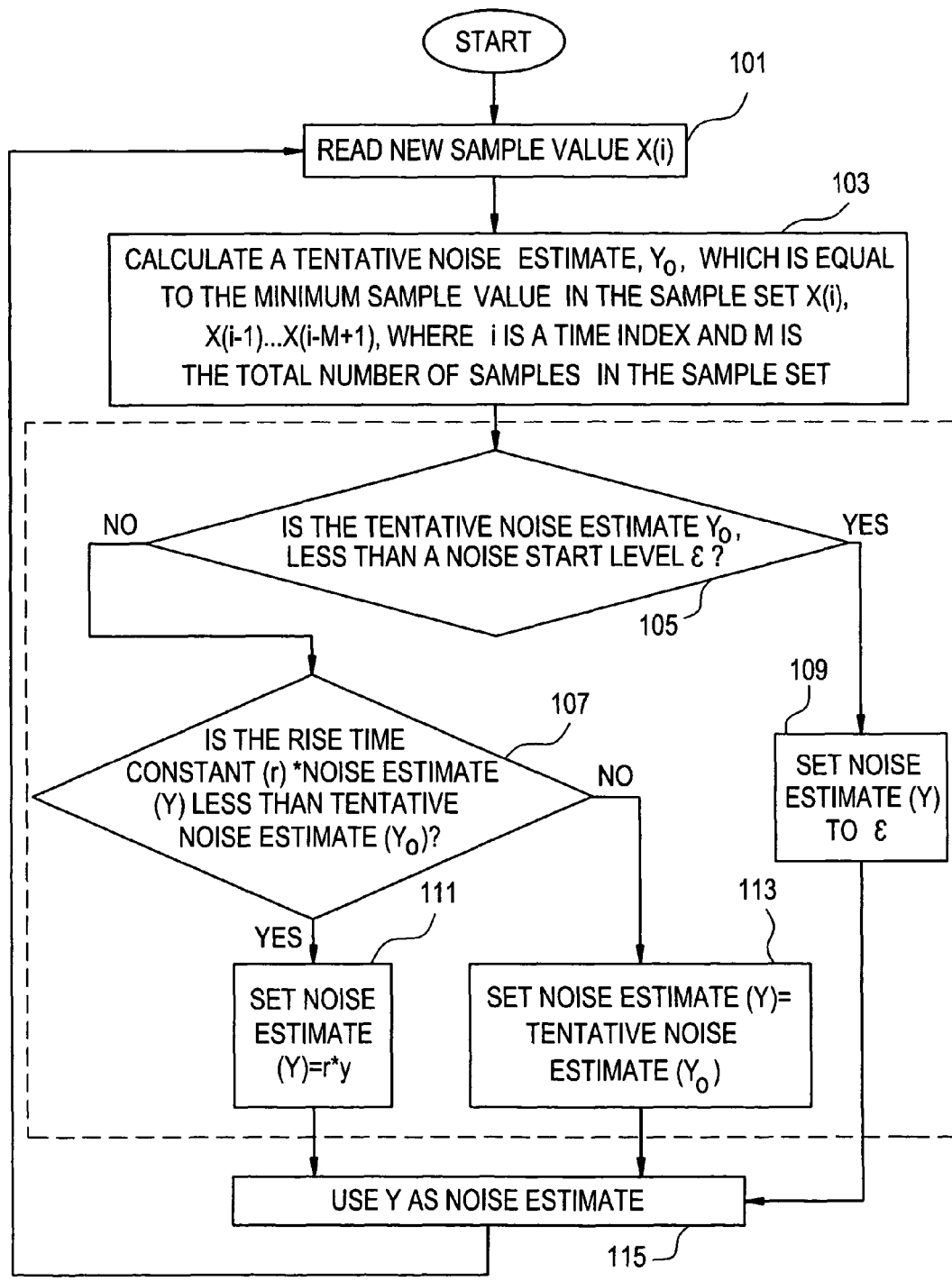
FIG. 1 is a flowchart setting forth an operational sequence performed by a prior art minimum rise (MR) filter design.

FIG. 1 is a flowchart setting forth an operational sequence performed by prior art minimum rise (MR) filter designs. The program commences at block 101 where a new sample value, denoted as x(i), is read. Next, at block 103, a tentative noise estimate, $Y_o$, is calculated, which is equal to the minimum sample value in the sample set of x(i), x(i−1), x(i−2) . . . x(i−M+1), where i is an integer representing a time index and M is the total number of samples in the sample set. At block 105, a test is performed to ascertain whether or not the tentative noise estimate, $Y_o$, is less than a noise start level E. If so, the noise estimate Y is set to E, and program control advances to block 115, to be described below. The negative branch from block 105 leads to block 107 where a test is performed to determine whether or not the product of a rise time constant r and the previous noise estimate Y is less than the tentative noise estimate $Y_o$. If not, the program advances to block 113, and if so, the program advances to block 111.

The affirmative branch from block 107 leads to block 111 where the noise estimate (y) is set to the product of r times Y. The program advances to block 115 where Y is used as the noise estimate, and the program then loops back to block 101.

Note that block 115 is also reached after execution of block 113. The negative branch from block 107 leads to block 113 where the noise estimate (y) is set to the tentative noise estimate ($Y_o$). The program advances to block 115 and then loops back to block 101. The dotted lines in FIG. 1 enclose an operational sequence that defines a rise-time-limitation filter.

Figure 2:
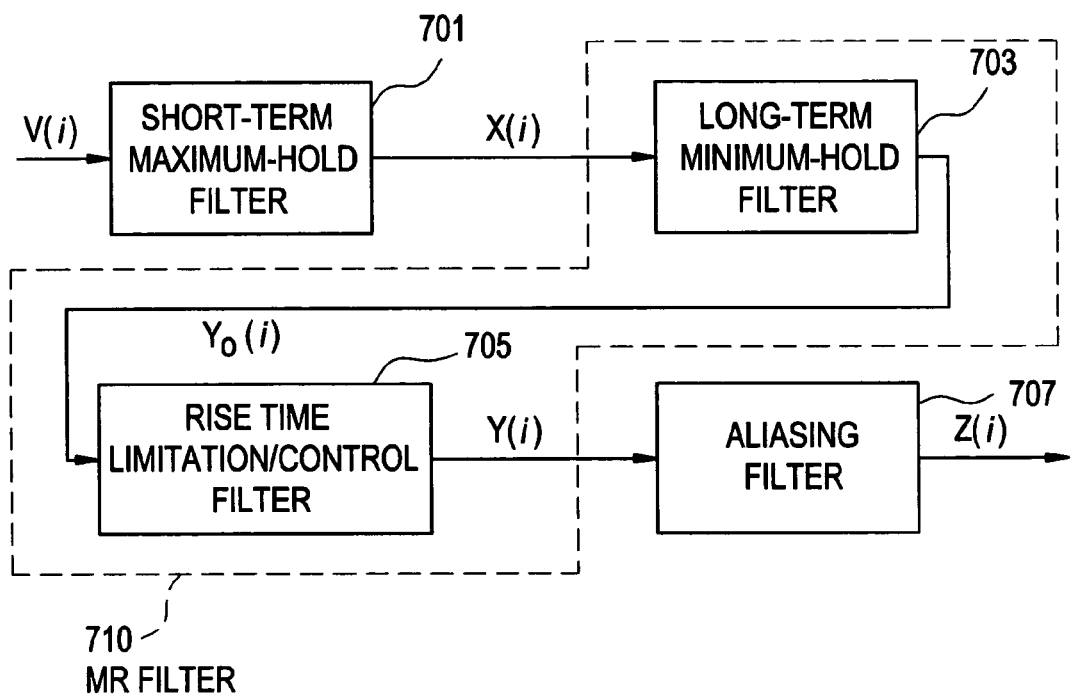
FIG. 2 is a hardware block diagram of a phonemic minima-tracking (PMT) noise estimator constructed in accordance with the principles of the first embodiment of the invention.

FIG. 2 is a hardware block diagram of a phonemic minima-tracking (PMT) noise estimator constructed in accordance with the principles of the first embodiment of the invention. This embodiment provides enhanced estimation of the noise component of a signal by undertaking a prefiltering of signal samples prior to noise estimation. The prefiltering discards any sample minima shorter than a specified duration from the signal samples so as to provide a prefiltered set of signal samples. In the example of FIG. 2, this prefiltering is performed by holding a maximum sample value from a set of signal samples for the specified duration. Holding the maximum sample value for a specified duration accounts for the fact that noise should be estimated at minimum sample values representing phonemic minima, and not at minimum sample values caused by noise canceling out speech. Such cancellation may occur when noise and speech have substantially opposite phases but similar magnitudes. In FIG. 2, the prefiltering is performed by a short-term maximum hold filter 701 which provides considerable computational expediency over the short-term smoothing filter used in the prior art.

The noise estimator of FIG. 2 includes three cascaded nonlinear filters in the form of the short-term maximum-hold filter 701, a long-term minimum-hold filter 703, and a rise-time limitation filter 705 One linear filter, aliasing filter 707, may be employed to filter the output of the rise-time limitation filter 705. The PMT noise estimator differs from prior art systems in terms of the type of pre-filter used. In prior art systems, a low pass smoothing filter is used as a pre-filter to smooth out fluctuations in the input. However, careful analysis of the purpose of the pre-filter shows that its function is to block minima shorter than 10 20 ms while providing complete transparency for minima of longer duration. Such a sharp transition from non-transparency to transparency cannot be achieved by the low pass smoothing filter used in the prior art. Due to the inherent characteristics of a linear low pass smoothing filter, the transition phase from non-transparency to transparency is spread out in time. By contrast, the short-term maximum hold filter 701 provides a sharp transition, avoiding missed detection (the case where a phonemic minimum is not detected when such a minimum actually occurred), and false detection (the case where a phonemic minimum is detected when no phonemic minimum is actually present). Moreover, the short-term maximum-hold filter is employed to account for the fact that the noise should be sampled when noise and speech have similar phases, such that their respective magnitudes add up instead of canceling out.

A short-term maximum-hold filter 701 of length L holds the maximum sample value from a sample set of L samples and can be expressed mathematically as $$x(i)=\max(v(i),v(i-1),\ldots,v(i-L+1)),$$

where v(i) denotes the filter input and x(i) denotes the filter output. This filter eliminates low-level "outlying" samples so as to address the possibility that noise and speech can momentarily cancel out each other if they are of similar magnitudes but opposite in phase. Such cancellation could occur over one frequency band, across several frequency bands, or even throughout the entire frequency band of the signal. Ideally, the composite magnitude, i.e., the magnitude of speech plus noise, is only evaluated when both noise and speech are in phase, at which instance the composite magnitude reaches its maximum. Consequently, short-term maxima are most relevant. The short-term maximum-hold filter ensures that the noise component is only tracked during true phonemic minima. Since phonemic minima typically last longer than 20 ms, the time-constant of the maximum-hold filter is set to $\tau_L\approx 20$ ms. Accordingly, the maximum hold filter 701 prevents minima shorter than 20 ms from reaching the input of long-term minimum hold filter 703. It should be noted that, in general, a short-term maximum hold filter provides considerable computational expediency over the prior art short-term smoothing filter. For this reason, a true short-term maximum hold filter 701 can be employed in FIG. 2 without adding much.

Assuming that the sequence v(i) is sampled at a sampling frequency $f_v$, then the required length L of short-term maximum hold filter 701 is determined by $$L=\tau_L f_v.$$

For a typical sampling frequency $f_v$ of 200 Hz, corresponding to a block length of 5 ms, the required length L of the filter is 4. This provides a filter of relatively small size, resulting in a small computational load. It may be noted that, instead of using a short-term maximum-hold filter 701 in the configuration of FIG. 2, any of a number of other filters could be employed to achieve the purpose of blocking out short minima. A median filter provides performance very similar to that of the maximum-hold filter, at the expense of higher computational complexity. A low pass (short-term smoothing) filter, as used in the prior art, although computationally the least intensive, provides degraded performance since such a filter does not satisfy the design criteria discussed above (i.e., substantially filtering out short minima). Also note that the maximum-hold filter is preferred over an ordinary exponentially decaying peak-tracker realized by a first order recursive filter since such a filter does not have a finite impulse response.

Through utilization of a short-term maximum hold filter, the PMT noise estimator of FIG. 2 provides a considerably more accurate noise estimate relative to the prior-art TTP noise estimator. However, the computational complexity of these two approaches (prior art and use of a short-term maximum hold filter) is still about the same. To reduce computational complexity, in accordance with an embodiment of the invention, a pseudo phonemic minima-tracking (PPMT) noise estimator may be utilized according to the second embodiment of the invention.

According to the second embodiment of the invention, enhanced estimation of the noise component of a signal is accomplished by undertaking a plurality of independent filterings of the signal, each filtering providing an estimate of a smallest sample in a sample set. One or more of these independent filterings may be implemented using the procedural sequence shown in FIG. 2. Note that, for frequency domain operation, this sample set is in the form of samples representing spectral magnitudes, whereas, for time domain operation, the sample set represents short term average (or RMS) values of a signal. Advantageously, the signal estimate having the smallest value represents an enhanced estimate of the noise component. This approach provides reduced computational complexity relative to the prior art technique of determining the actual value of the smallest sample. In the prior art, a mathematical minimum operator must be employed to determine the actual sample value, and this operation is quite resource-intensive relative to the process of estimation.

In developing a PPMT noise estimator for implementing the filtering process described in the preceding paragraph, the inventors have realized that the minimum rise (MR) filter of FIG. 1 is not the only type of filter that is capable of tracking minimum values in sample sets. Another type of filter which has minimum tracking properties is the Delayed Rise (DR) filter shown in FIG. 2. A DR filter does not, in general, provide a value for the true minimum sample in a sample set. Rather, the DR filter merely provides an estimate of the minimum sample. Since both the DR filter and the MR filter utilize a rise-time-limitation filter, this filter need not be considered for purposes of comparing the performance of the DR filter to that of the MR filter. In the case where no rise-time-limitation filter is employed, a DR filter of length M provides an estimate for the minimum value that occurs in a sample set consisting only of the previous M signal samples x(i), x(i−1), . . . x(i−M+1). This estimate lies within a well-defined range having an upper bound and a lower bound. The lower bound of the output of the DR filter coincides with the true minimum value in the sample set of M samples, and this relationship is mathematically denoted by the expression:

$$\min(x(i),x(i-1),\ldots,x(i-M+1)),$$

where x(i) represents the signal fed to the input of the DR filter. If the filter reaches the lower bound, it performs as a true minimum-hold filter. The upper bound, that is, the maximum value that the DR filter will provide for a given input sequence, equals the most recent sample value x(i). The output y(i) of the filter can therefore be characterized by the following bounds:

$$\min(x(i),x(i-1),\ldots,x(i-M+1)) \leq y(i) \leq x(i)$$

It is important to note that a single DR filter only provides an approximation of the smallest sample, whereas the minimum rise filter used in prior art designs identifies the smallest sample.

Figure 3:
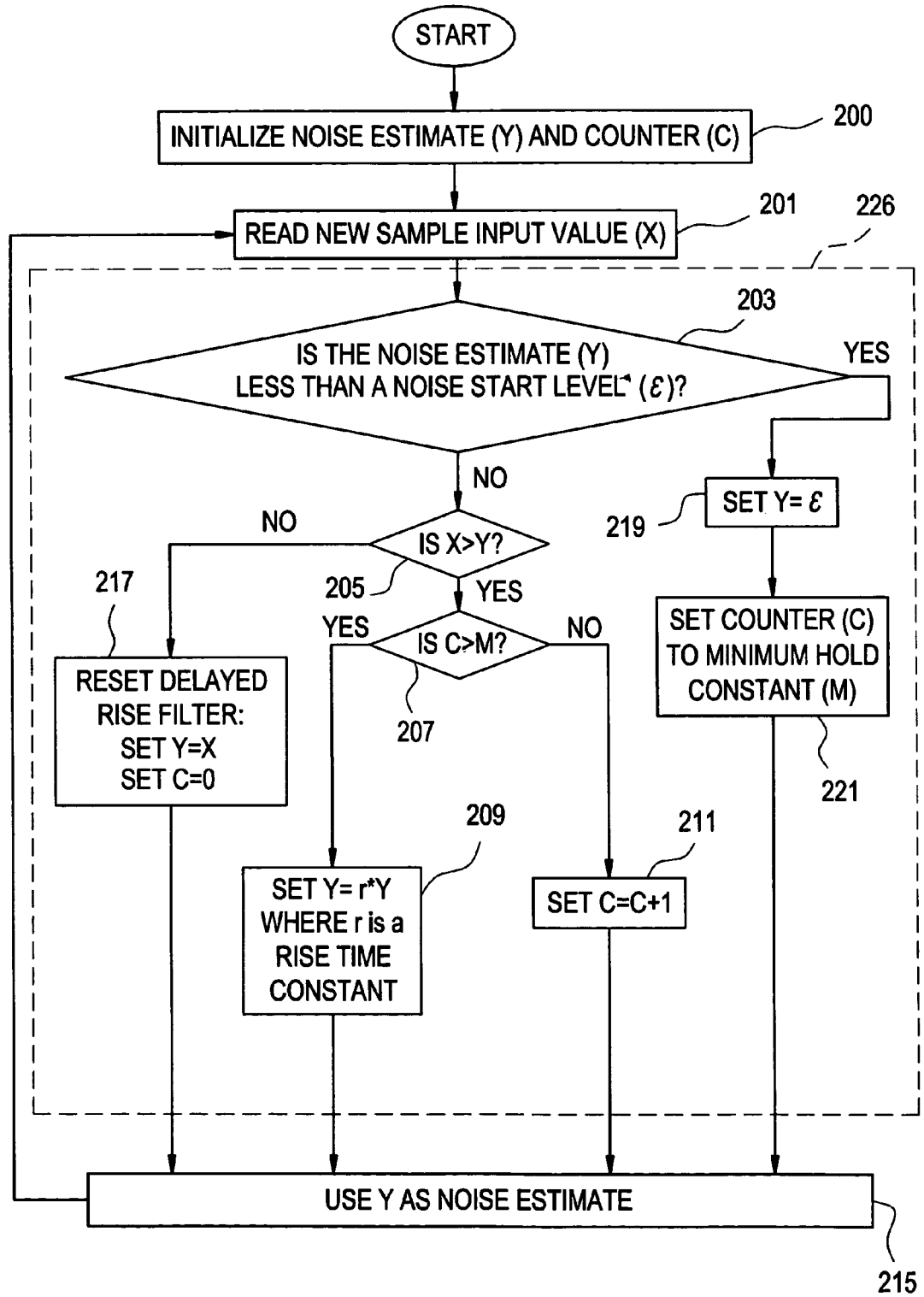
FIG. 3 is a flowchart setting forth an operational sequence performed by a delayed rise (DR) filter design which may be used to perform the second embodiment of the invention.

FIG. 3 is a flowchart setting forth an operational sequence performed by an illustrative delayed-rise (DR) filter design. The operational sequence commences at block 200, where the algorithm is initialized, i.e., an initial noise estimate (Y) and a minimum-hold counter (C) is set. At block 201, a new sample input value (X) is read. Next, at block 203, a test is performed to ascertain whether or not the noise estimate (Y) is less than a noise start level (E). If so, Y is set to E (block 219), a counter (C) is set to a minimum hold constant (M) (block 221), and Y is used as the final noise estimate. The noise start level E may be set equal to the inherent noise level of the system. The mechanism of a minimum noise level ensures that the noise estimate does not fall below an unrealistic low value, in which case, it could take the rise-time filter a long period of time to recover.

The negative branch from block 203, representing the regular or "normal" operating mode, leads to block 205 where a test is performed to ascertain whether or not X is greater than Y If not, the DR filter is reset by setting Y to X, and by setting C to zero (block 217). Y is then used as the final noise estimate (block 215). The affirmative branch from block 205 leads to block 207 where a test is performed to determine whether or not C is greater than M If not, C is set to C+1 (block 211), and Y is used as the final noise estimate (block 215). The affirmative branch from block 207 leads to block 209 where Y is set to the product of r times Y, r representing a rise time constant. Y is then used as the final noise estimate (block 215). Block 226 encloses the sequence of operations which are used to implement the delayed-rise filter.

As stated above, it is important to note that a single DR filter (FIG. 3) only provides an approximation of the smallest sample, whereas the minimum rise filter used in prior art designs determines the smallest sample. However, by placing a set of DR filters in parallel, one can approximate the performance of a minimum-rise filter. As the number of parallel-connected DR filters is increased, the performance of this parallel combination more closely approximates the performance of a minimum-rise filter. Therefore, any arbitrarily-specified level of performance may be achieved by connecting the requisite number of DR filters in parallel. If a total of M DR filters are connected in parallel, the performance of such a combination is exactly identical to the performance of the minimum-hold filter. This relationship is mathematically denoted as:

$$\min(x(i),x(i-1),\ldots,x(i-M+1))=y(i)$$

That is, the upper and lower bounds are identical and equal to the true minimum. The preceding mathematical identity is achieved by resetting one of the M parallel-connected DR filters once every sample cycle, and then by using a comparator to select the output of the DR filter having the lowest-magnitude output sample. If it is desired to lower the complexity of the overall system, the number of parallel-connected DR filters is kept small. A configuration with any number of parallel-connected DR filters having outputs coupled to a comparator as described above is hereinafter referred to as pseudo minimum rise (PMR) filter.

Figure 4:
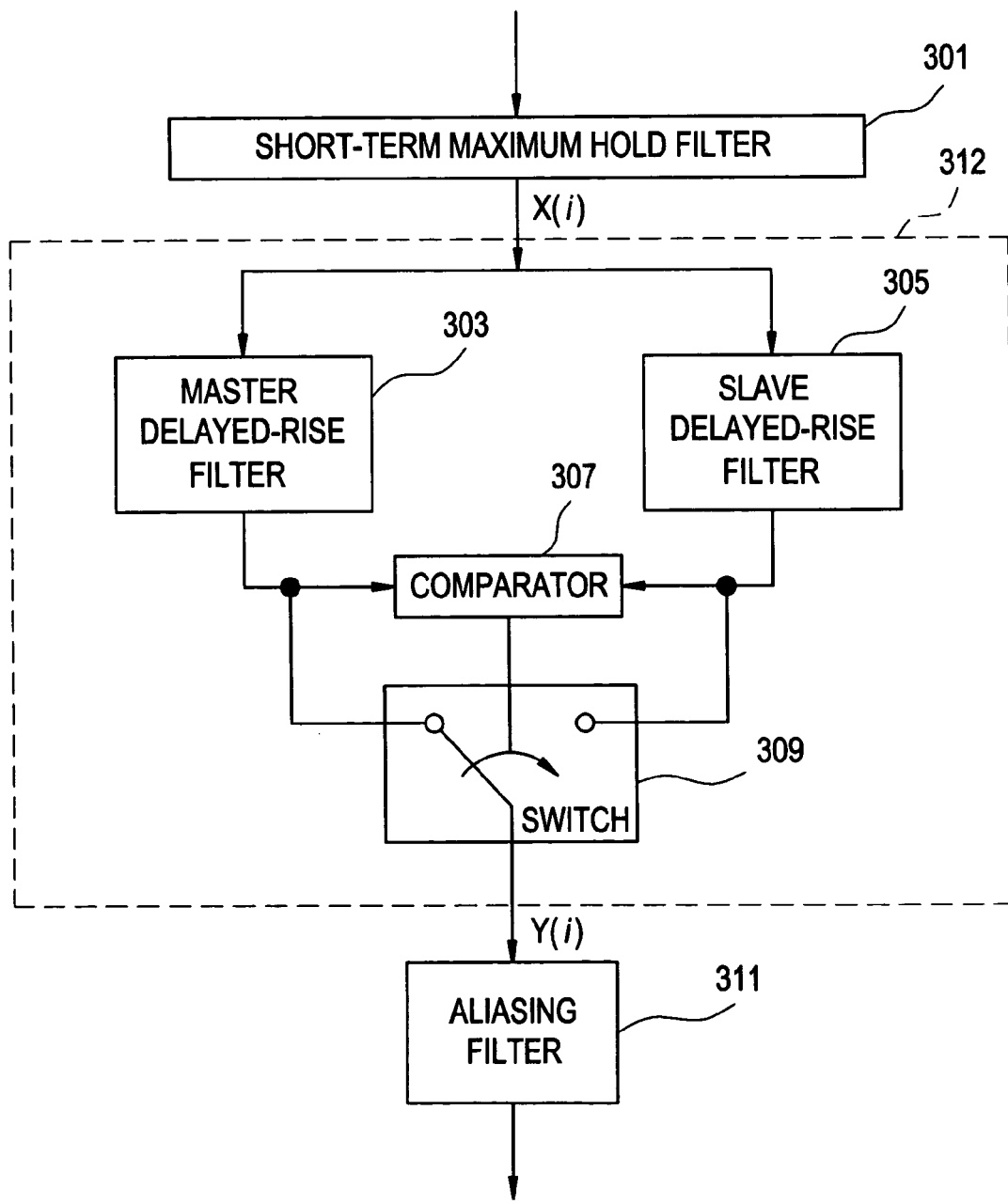
FIG. 4 is a hardware block diagram showing an illustrative embodiment of a pseudo phonemic minima tracking (PPMT) noise estimator including a pseudo minimum rise (PMR) filter constructed in accordance with the principles of the first and second embodiments of the invention.

FIG. 4 is a hardware block diagram showing an illustrative embodiment of a pseudo phonemic minima tracking (PPMT) noise estimator constructed in accordance with the principles of the invention. The noise estimator includes three main blocks, an optional short-term maximum hold filter 301, a pseudo minimum rise (PMR) filter 312, and an aliasing filter 311. Two parallel-connected DR filters are employed; namely, a master delayed-rise filter 303 and a slave delayed-rise filter 305. The configuration of FIG. 4 may be applied in the time domain or in the frequency domain. Accordingly, the input to the system of FIG. 4 depends upon whether frequency-domain or time-domain operation is contemplated. For frequency domain operation, this input is in the form of samples representing spectral magnitudes. For time domain operation, the input is in the form of samples representing short term average (or RMS) values of a signal. These short-term average values may be determined only on a periodic basis; that is, for example, every 5 ms, such that the noise estimator is running at a lower sampling rate (e.g. 1/5 ms=200 Hz). The same is true for a corresponding frequency domain implementation, where a Fast Fourier Transform (FFT) may be performed every 5 ms. In the time-domain version, the optional short-term maximum-hold filter 301 could be eliminated at the expense of a potential loss in performance. However, if this filter is, indeed, eliminated, the short-term average needs to be calculated at least over several milliseconds, say 20 ms, which represents the minimum duration of a phonemic minima.

In the example of FIG. 4, samples are fed to a maximum-hold filter 301. As stated above in connection with FIG. 2, a maximum-hold filter 301 of length L holds the maximum sample value from a sample set of L samples. This filter eliminates low-level "outlying" samples so as to address the possibility that noise and speech can momentarily cancel out each other if they are of similar magnitudes but opposite in phase. Such cancellation could occur over one frequency band, across several frequency bands, or even throughout the entire frequency band of the signal. Ideally, the composite magnitude, i.e., the magnitude of speech plus noise, is only evaluated when both noise and speech are in phase, at which instance the composite magnitude reaches its maximum. Consequently, short-term maxima are most relevant. The short-term maximum-hold filter ensures that the noise component is only tracked during true phonemic minima. Since phonemic minima typically last longer than 20 ms, the time-constant of the maximum-hold filter is set to $\tau_L \approx 20$ ms. Accordingly, the maximum hold filter 301 prevents minima shorter than 20 ms from reaching the input of pseudo minimum rise (PMR) filter 312. It should be noted that, in general, a short-term maximum hold filter provides considerable computational expediency over the prior art short-term smoothing filter. For this reason, a true maximum hold filter 301 can be employed in FIG. 4 without adding much complexity.

Assuming that the sequence v(i) is sampled at a sampling frequency $f_v$, then the required length L of maximum-hold filter 301 is determined by $$L = \tau hd L \cdot f_v.$$

For a typical sampling frequency $f_v$ of 200 Hz, corresponding to a block length of 5 ms, the required length L of the filter is 4. This provides a filter of relatively small size, resulting in a small computational load. It may be noted that, instead of using a maximum-hold filter 301 in the configuration of FIG. 4, any of a number of other filters could be employed to achieve the purpose of blocking out short minima. A median filter provides performance very similar to that of the maximum-hold filter, at the expense of higher computational complexity. A lowpass (short-term smoothing) filter, as used in the prior art, although computationally the least intensive, provides degraded performance since such a filter does not satisfy the design criteria discussed above (i.e., substantially filtering out short minima). Also note that the maximum-hold filter is preferred over an ordinary exponentially decaying peak-tracker realized by a first order recursive filter since such a filter does not have a finite impulse response.

The output of maximum-hold filter 301 is fed to both master and slave delayed-rise filters 303, 305, respectively. The master and slave delayed-rise filters 303, 305 are characterized by a minimum hold time, $\tau_M$, representing the minimum amount of time that the filter output will be held at a given value, and also by a rise time, $\tau_R$, representing the amount of time required for a 20-dB increase in the magnitude of the estimated noise. Note that an illustrative hardware block diagram for a DR filter was shown in FIG. 3.

A comparator 307 successively compares the output magnitude of the master delayed-rise filter 303 with that of the slave delayed-rise filter 305, and controls a switch 309 so as to select the filter output having the lowest magnitude output sample. An optional aliasing filter 311 may be used to suppress estimated noise components which, from a theoretical point of view, should not exist and which could represent remaining speech components. The components within the dashed lines represent a PMR filter 312.

From a qualitative standpoint, the configuration of FIG. 4 avoids following a speech signal when estimating noise. The master and slave DR filters 303, 305 define the maximum allowable rise of the estimated signal per unit time. This determines how fast the DR filter can track noise. The DR filters are based upon the assumption that noise does not change as rapidly as speech, and this assumption is valid for most types of noise. For this reason, it is difficult or impossible to estimate an upward noise transient in which the noise level increases too abruptly. However, a downward transient, i.e., a decreasing noise level can be tracked much faster, since the adaptation to lower noise estimates is only limited by the maximum-hold filter 301.

It would be possible to achieve great accuracy in estimating noise if the configuration of FIG. 4 were to include M parallel-connected DR filters instead of only a master DR filter 303 and a slave DR filter 305, M representing the number of samples in a sample set. However, if M DR filters were employed, selecting the lowest-magnitude output value from among a total of M parallel-connected DR filters would require a comparator 307 that implements a minimum operator of order M. Accordingly, this technique for determining minimum sample values would not provide reduced computational complexity over the prior art method described above. However, by relaxing the upper bound, it is possible to compromise accuracy for complexity. Best performance is achieved with a low upper bound, whereas the lowest complexity is achieved by using the least number of parallel-connected DR filters.

In analyzing the relationship between complexity and accuracy, a configuration using N DR filters in parallel, combined with a min-operator of order N, will be referred to as an Nth order PMR (pseudo MR) filter. For an Nth order PMR filter, the output is limited by $$\min(x(x), x(i-1), \ldots, x(i-M+1)) \leq y(i) \leq \min(x(i), x(i-1), \ldots, x(i-N-1/N \cdot M))$$

assuming that, for every M/N sampling cycle, one of the DR filters is reset. It is observed that, if N=M, the preceding equation reduces to $$\min(x(i), x(i-1), \ldots, x(i-M+1)) = y(i) \ldots$$

that is, using M parallel-connected filters, the performance of a true minimum-hold filter is achieved, as noted previously. If N=1, the preceding equation reduces to:

$$\min(x(i), x(i-1), \ldots, x(i-M+1)) \leq y(i) \leq x(i).$$

The noise estimator of FIG. 4 approximates the performance of a true PMT noise estimator by using a $2^{nd}$ order PMR filter. In this example, the $2^{nd}$ order min-operator is effectively implemented using comparator 307, which selects the better-performing filter output (lower output) out of the master DR filter 303 and the slave DR filter 305.

Figure 5:
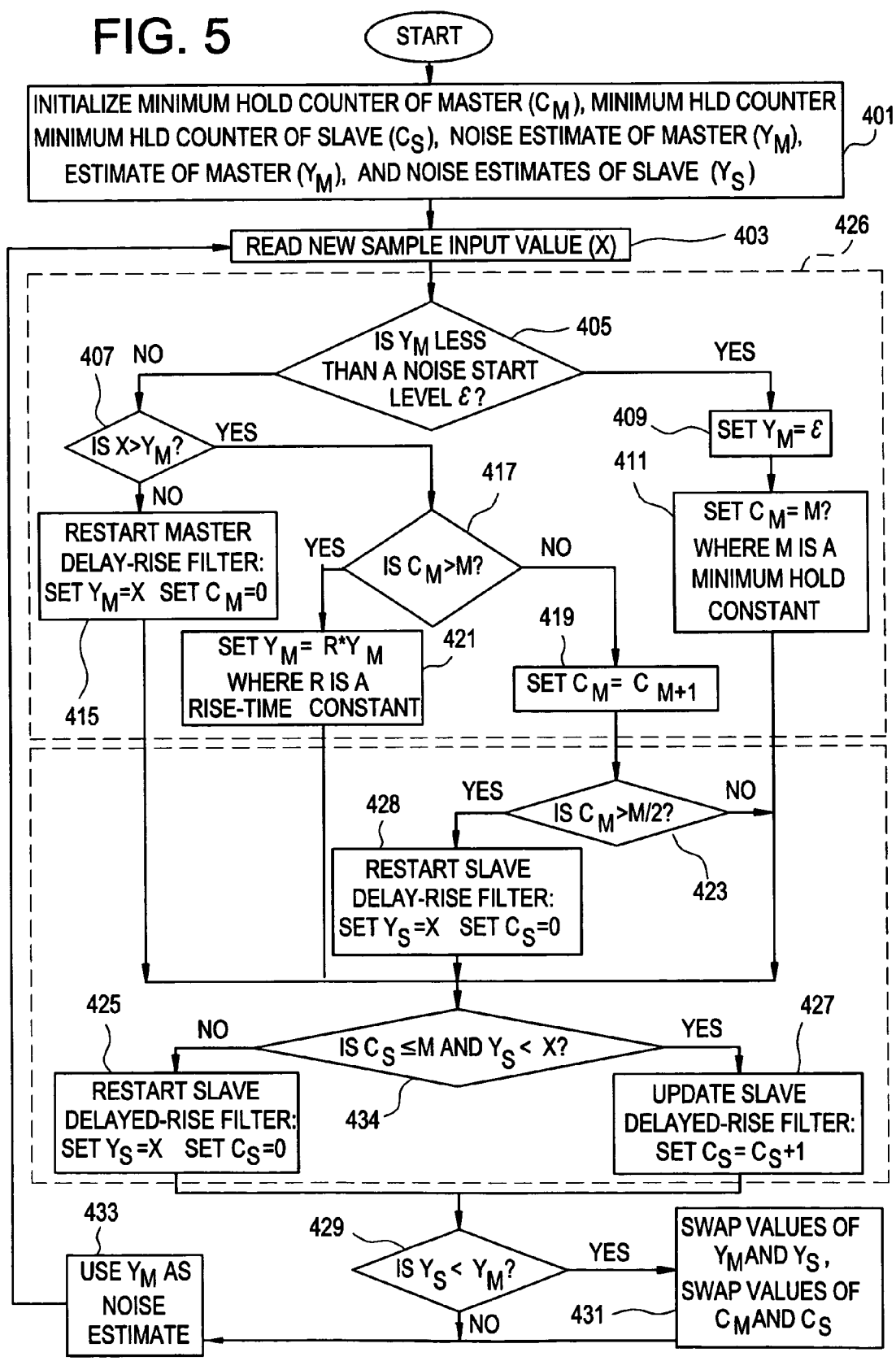
FIG. 5 is a flowchart setting forth the sequence of operations performed by the pseudo minimum rise (PMR) filter used in FIG. 4.

FIG. 5 is a flowchart setting forth the sequence of operations performed by the filter design of FIG. 4. The program commences at block 401 where a minimum hold counter of a master DR filter, denoted as $C_M$, a minimum hold counter of a slave DR filter, denoted as $C_S$, a noise estimate from the master DR filter, denoted as $Y_M$, and a noise estimate from the slave DR filter, denoted as $Y_S$, are all initialized. Next, at block 403, a new sample input value (X) is read. A test is performed at block 405 to ascertain whether or not $Y_M$ is less than a noise start level E. If so, then $Y_M$ is set to E (block 409), and $C_M$ is set to M, where M denotes a minimum hold constant (block 411). The program then continues at block 434.

The negative branch from block 405 leads to block 407 where a test is performed to determine whether or not X is greater than $Y_M$. If not, the master delayed-rise (DR) filter is restarted by setting $Y_M$ to X and by setting $C_M$ to zero (block 415), and the program continues at block 434. The affirmative branch from block 407 leads to block 417 where it is determined whether or not $C_M$ is greater than M. If $C_M$ is greater than M, then $Y_M$ is set to the product of r times $Y_M$, where r is a rise time constant (block 421), and the program continues at block 434. If $C_M$ is not greater than M, $C_M$ is set to $C_M+1$ and the program continues at block 423.

The operations of block 423 are performed after $C_M$ is set to $C_M+1$ in block 419. At block 423, a test is performed to ascertain whether or not $C_M$ is equal to M/2. If so, the program progresses to block 428 where the slave delayed-rise filter is restarted by setting $Y_S=X$, and by setting $C_S$ to zero. The program then advances to block 434.

Block 434 may be reached from block 415, block 421, or block 411, as well as from block 423. At block 434, a test is performed to determine whether or not $C_S$ is less than or equal to M, and $Y_S$, is less than X. If both of these conditions are met, the program advances to block 427 where the slave delayed-rise filter is updated by setting $C_S$ to $C_S+1$, and the program continues on to block 429. If one or both of the conditions of block 434 are not met, the program goes to block 425, where the delayed-rise filter is restarted by setting $Y_S$ to X, and by setting $C_S$ to zero. The program then advances to block 429.

At block 429, a test is performed to determine whether or not $Y_S$ is less than $Y_M$. If so, the values of $Y_M$ and $Y_S$ are swapped, the values of $C_M$ and $C_S$ are also swapped (block 431), and the program continues to block 433. The negative branch from block 429 also leads to block 433, where $Y_M$ is used as the noise estimate. The program then loops back to block 403.

Figure 6:
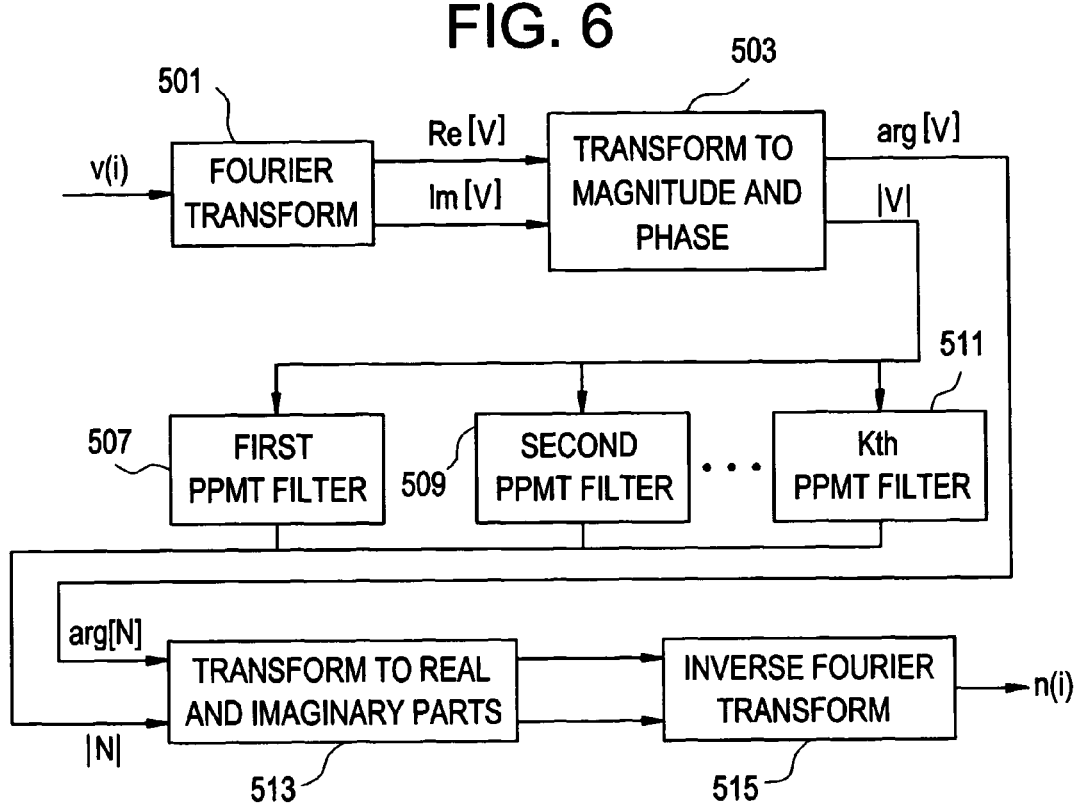
FIG. 6 is a hardware block diagram showing an illustrative embodiment of a noise estimator using a respective PPMT filter for each of a corresponding plurality of frequency bands.

FIG. 6 is a hardware block diagram showing an illustrative embodiment of a noise estimator using a respective PMR filter for each of a corresponding plurality of frequency bands. By way of background, a number of techniques exist for processing a signal in the frequency domain. A commonly utilized technique is called "overlap-add", where individual signal blocks are overlapped and added to construct or synthesize a signal. FIG. 6 shows a novel system for processing these signal blocks in the operational environment of "overlap-add". Block 501 calculates the Fourier transform, which provides the spectrum of the signal in form of real and imaginary parts, denoted as Re[V] and Im[V]. Real and imaginary part are transformed into spectral magnitude |V| and spectral phase arg[V] (block 503). Each individual frequency magnitude is connected to a PPMT filter (blocks 507, 509, ..., 511). The output signals from the PPMT filters provide the estimate for the spectral magnitude of the noise |N|. For many application, such as spectral noise reduction, a spectral representation of the noise estimate will suffice, and such a representation is developed by adding the outputs of blocks 507, 509, ..., 511. For applications where an estimate for the noise signal is desired, the spectral noise estimate and the phase arg[V] of the original signal is fed to block 513, which transforms magnitude and phase to real and imaginary parts. Finally, block 515 performs an inverse Fourier transform and provides the estimated noise signal.

By splitting the signal into a plurality of frequency bands as shown in FIG. 6, the resulting noise estimate is considerably more accurate than the noise estimate obtained from a full-band noise estimator that processes the entire frequency band as a single entity. The reason for the increased performance of a frequency-domain noise estimator is due to the frequency dependence of phonemic minima. Assume a phonemic minimum occurs at low audio frequencies (e.g., produced by an unvoiced /s/) followed by a phonemic minimum at high audio frequencies (e.g., produced by a voiced /o/). These minima appear very clearly in the respective individual audio frequency bands. If full-band processing is employed instead of split-band processing, minima which occur at high audio frequencies are likely to disappear since they may be masked by low audio frequency components of the voice signal occurring at the same time. On the other hand, minima at low audio frequencies are often still present in the time domain (full-band) signal. In view of phonemes, a time-domain noise estimator relies mainly on low-level unvoiced consonants, which produce only quasi-minima. These quasi-minima only help to identify noise above the level of these low-level consonants. If the noise level is below the level of these consonants, then short pauses before explosive consonants and true speech pauses could be used for estimating the noise level. However, if information acquired during these pauses is used to estimate the noise level, the time constant of the minimum-hold filter must be increased.

Several advantages arise from using a frequency-domain noise estimator, an illustrative example of which is shown in FIG. 6, versus a time-domain (full-band) noise estimator. These advantages include a faster adaptation to noise, an increased dynamic range within which noise can be estimated, and the utilization of information regarding the spectral properties of the noise. However, a time-domain noise estimator provides greater simplicity than a frequency-domain noise estimator. For a given system application, the advantages of the frequency-domain approach may be weighed against the simplicity of the time-domain technique.

Figure 7:
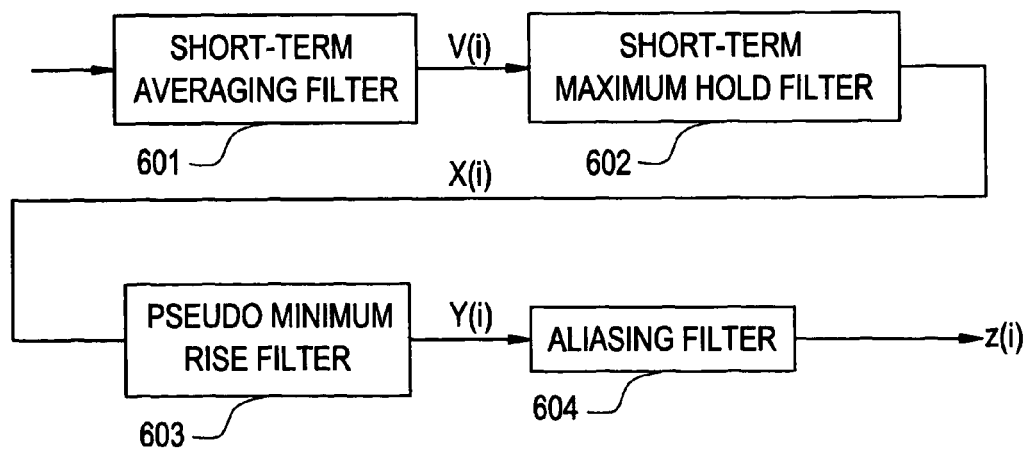
FIG. 7 is a hardware block diagram showing an illustrative embodiment of a time domain noise power estimator constructed in accordance with the principles of the invention.

FIG. 7 is a hardware block diagram of an illustrative full-band implementation of the noise estimator constructed according to the invention. A noisy speech signal is fed to a short-term averaging filter 601, which performs a short-term average calculation. The output of short-term averaging filter 601 is connected to an optional short-term maximum hold filter 602. Although the short-term maximum hold filter 602 is optional, its elimination may result in a performance loss. Moreover, if this short-term maximum hold filter is eliminated, the short-term average needs to be calculated at least over several milliseconds, say 20 ms, in order to smooth out short minima that are not originating from phonemic speech minima. The output of short-term maximum hold filter 602 is fed to a PMR filter 603, the structure and function of which have been previously described. An optional aliasing filter 604 may be employed to filter the output of PMR filter 603.

To provide a deeper analysis of the phonemic minima tracking noise estimator, a detailed discussion of FIG. 2 follows. As stated above, the duration of phonemic minima, as well as the duration between two consecutive minima, may be used to discriminate speech from noise. The short-term maximum-hold filter 701 is designed to implement the first of these discrimination features. More specifically, maximum-hold filter 701 discards short minima having a duration less than $\tau_L$. These short minima are discarded because they do not represent speech, but rather are a result of the phase relationship between speech and noise. The maximum-hold filter is designed to substantially eliminate these rapid minima, while at the same time preserving the characteristic, long-lasting minima of the speech spectral magnitude components, also termed phonemic minima.

The long-term minimum-hold filter 703 exploits the second discrimination feature, that is, the distance between successive phonemic minima in speech within a single spectral component. Assume that the noise remains stationary over a time period of more than $\tau_M$. Within this time period, the speech is likely to encounter a phonemic minima, in which case, the speech component of the composite (speech plus noise) sample closely approaches zero. Therefore, the noise becomes accessible during phonemic minima. To take advantage of this situation, a long-term minimum-hold filter 703 is employed which determines the minimum within a given time period $\tau_M$.

Rise time limitation filter 705 is designed to prevent the system from following any remaining speech spurts at the output of long-term minimum hold filter 703. Rise-time limitation filter 705 may be implemented using the components enclosed within the dashed lines of FIG. 1 and described above as the rise-time-limitation filter. Conceptually, rise-time limitation filter 705 controls adaptation to noise, such that the noise estimate may increase only a pre-defined number of dBs per second, until the noise estimate reaches the level of a spectral minimum. In other words, rise time filter places a limit on the maximum allowable rise of its output signal per unit of time. This adaptation property is most apparent in cases where the onset of noise is rather sudden. Such a level-independent filter that limits the rise time of the output signal has properties that are mathematically denoted as $$y(i) = \begin{cases} r \cdot y(i-1); & \text{if } E < r \cdot y(i-1) < x(i) \\ E; & \text{if } r \cdot y(i-1) < E \\ x(i); & \text{else} \end{cases}$$

where x(i) is the input, y(i) the output, E the noise start level, and r>1 the rise-time coefficient. The rise-time may be specified as the time required for a 20 dB increase of the noise estimate. For a given rise-time $\tau_R$ the rise-time constant r can be calculated by the $$r = 1^{1/f_x \tau_R}$$

where $f_x$ denotes the sampling frequency of the sequence x(i). Rise-time $\tau_R$ may be set to a duration on the order of several hundred milliseconds. The rise-time limitation filter controls the attack time of the noise estimator to prevent sudden large increments of the noise estimate and instead provides a gradually increasing noise estimate. Consecutive multiplication with the rise-time constant results in a logarithmic increase of the noise estimate, that is, a fixed number of dBs per second. Rise-time constant r is set slightly greater than one. The more this constant approaches one, the smaller the increase of the noise estimate per time and the larger the rise-time. Note that minimum-hold filter 703 and rise-time limitation filter 705 affects only the positive slope of the noise estimate (attack), while the short-term maximum-hold filter 701 affects only the negative slope of the noise estimate (release).

Aliasing filter 707 is employed to implement the second discrimination feature mentioned above. According to sampling theory, one can only estimate noise up to frequency $f_m = \frac{1}{2} \cdot 1/\tau_M$ assuming a sampling frequency of $1/\tau_M$. Hence, estimates for frequencies above $f_m$ carry no valid information. These frequency components are removed by the aliasing filter 707. The filter coefficients of the aliasing filter 707 may be scaled to adjust for a potential bias. However, unlike the previous art TTP noise estimator, scaling the aliasing filter is not an inherent part of the PMT noise estimator.

The PMT noise estimator of FIG. 2 utilizes the two discrimination features mentioned above; namely, the duration of phonemic minima and the duration between two consecutive minima, which are described in terms of time constants $\tau_L$ and $\tau_M$. An additional time parameter, $\tau_R$, the rise time limitation constant, controls the adaptation of the noise estimate. The PMT noise estimator estimates the noise spectral magnitude not only during speech pauses, but also during speech activity. Performing noise estimation continuously over non-speech segments, as well as over speech segments, circumvents the need for a speech-activity detector. Therefore, the PMT noise estimator does not rely on a speech-activity detector, the performance of which usually deteriorates rapidly with an increasing noise level. For a non-disturbed speech signal, the PMT noise estimator tracks the phonemic minima. If the speech is disturbed by noise, the phonemic minima are filled up with noise and the noise is tracked instead.

The PMT noise estimator is based upon an observation that noise can be estimated more accurately if the noise parameters are estimated constantly; that is, during periods of no speech activity and also during periods of speech. More importantly, however, the technique advantageously exploits the fact that there is a difference between the stationarity characteristics of the desired signal and the stationarity characteristics of noise.

In many applications, noise parameters, such as the auto-correlation coefficients of the noise, are stationary over a longer period of time than corresponding parameters of the desired signal. Auto-correlation coefficients having relatively long periods of stationarity (as compared to other autocorrelation coefficients) are presumed to represent noise, and, as such, the PMT noise estimator uses this fact to calculate an estimate of the noise signal. For example, consider a noisy speech signal originating from a car's cellular phone. The speech signal is typically stationary over a time period of about 20 to 200 ms, while noise within the passenger compartment of the car can often be represented as a stationary sequence of parameters having a duration much longer than 200 ms. Therefore, parameters which remain relatively constant for a time duration of longer than 200 ms may be presumed to characterize the noise portion of a signal, whereas parameters which exhibit substantial changes within a time interval of less than 200 ms likely characterize the voice portion of the signal.

The techniques of the first embodiment of the invention take into account a realization that, in speech, the duration of spectral minima, as well as the distance between consecutive spectral minima within a spectral component, are parameters that generally fall within a characteristic range of values. Spectral minima during speech activity are caused by the phonemic structure in speech, such as an alternating occurrence of voiced and unvoiced phonemes. Accordingly, these minima may be referred to as spectral phonemic minima, or, to be more concise, phonemic minima. Phonemic minima occur in the presence of a number of phonemes as shown in Table 1.

TABLE 1

Phonemes that Produce Phonemic Minima

| Phonemes | Description |
| --- | --- |
| Unvoiced stop constants /p/, /t/, /k/ | These constants are preceded by short pauses as the lips are pressed together to build up the air for the formation of the sound. The average duration of these pauses is about 50 ms. |
| Unvoiced fricatives /f/, /θ/, /s/, /sch/ | For these phonemes, low frequency audio components are strongly reduced. |
| Voiced vowels /u/, /o/ | For these dark-sounding vowels, high frequency audio components are reduced. |
| Voiced phonemes | In these phonemes, the valleys between formant poles reach low values. |
| High pitched voiced phonemes | In these phonemes, the valleys between harmonics of the pitch frequency reach low values. |

The duration of spectral minima and the duration between two consecutive spectral minima may be used to discriminate speech from noise. For speech, a first discrimination feature can be defined as the duration of phonemic minima, characterized by a time period of $\tau_p$. The lower bound of $\tau_p$ is given by the minimum duration of a pause before an unvoiced stop consonant. The upper bound of $\tau_p$ is given by the maximum duration of a phoneme. Minima of duration $\tau_p$ in a composite signal in stationarity are therefore attributed to speech. These phonemic minima allow access to the noise spectrum at the variable rate of their occurrence. The rate at which these minima occur constitutes a second discrimination feature. The corresponding duration between two consecutive phonemic minima is denoted by a time constant $\tau_m$. The noise is assumed to be stationary between two consecutive phonemic minima, and this assumption is valid for near-stationary noise.

The PMT noise estimator described above can be applied to estimate near-stationary and stationary noise.

Acronyms Used in Text:

Filters:

| | |
|---|---|
| DR | Delayed Rise |
| MR | Minimum Rise (Minimum-hold followed by Rise-time limitation filter) |
| PMR | Pseudo Minimum Rise |

Noise Estimators:

| | |
|---|---|
| PMT | Phonemic Minima Tracking |
| PPMT | Pseudo Phonemic Minima Tracking |
| TTP | Two Time Parameter |

I claim:

1. An apparatus comprising:
a prefilter for prefiltering an input sample set during periods of no speech activity and during periods of speech activity and prior to noise estimation of a signal, the prefilter being adapted to discard spectral minima in the sample set that are shorter than a specified duration so as to provide a set of samples prefiltered both during periods of no speech activity and during speech activity for noise estimation, wherein the input sample set includes either samples representing spectral magnitudes of the signal or samples representing short term average magnitude values of the signal.

2. The apparatus of claim 1 wherein the prefilter includes means for holding a maximum sample value from a sample set for a specified duration.

3. The apparatus of claim 2 wherein the prefilter includes a short-term maximum hold filter.

4. An apparatus for estimating the noise component of a sampled signal comprising:
 (a) prefiltering means for prefiltering an input sample set during periods of no speech activity and during periods of speech activity and prior to noise estimation of a signal, the prefiltering means discarding spectral minima in the input sample set that are shorter than a specified duration so as to provide a set of samples prefiltered both during periods of no speech activity and during speech activity for noise estimation, wherein the input sample set includes either samples representing spectral magnitudes of the signal or samples representing short term average magnitude values of the signal;
 (b) a plurality of filtering means each providing an estimate of a minimum sample in the sample set; and
 (c) comparing means, coupled to the plurality of filtering means, for successively comparing estimates among the plurality of filtering means, and selecting the signal estimate having the lowest magnitude as a noise component estimate.

* * * * *